2,977,329

RUBBER COMPOSITION CONTAINING AN AMIDINE NITRITE AND METHOD OF PREPARING CELLULAR PRODUCT THEREFROM

Hans Z. Lecher, Plainfield, and Frederic H. Adams, Bound Brook, N.J., assignors to American Cyanamid Company, New York, N.Y., a corporation of Maine No Drawing. Filed June 25, 1957, Ser. No. 667,955

10 Claims. (Cl. 260—2.5)

The present invention relates to cellular organoplastic materials. More particularly, it relates to a method of preparing such cellular organoplastics using a new class of blowing agents comprising amidine nitrites.

In the manufacture of cellular organoplastics, a blowing agent is incorporated into the uncured material and the mixture subjected to curing. The gaseous decomposition product thus released "blows" the organoplastic forming minute cells throughout. Certain properties make a successful blowing agent. A blowing agent should be stable on storage, shipment and handling but should be unstable at the curing temperature without decomposing explosively. It should disperse evenly or dissolve in the uncured organoplastic to permit formation of fine uniform cells. A blowing agent and its decomposition product should be nontoxic and odorless.

In preparing cellular rubber, decomposition of the blowing agent should occur only after vulcanization has partially proceeded so that the rubber stock has sufficient strength to retain the gaseous decomposition product. Decomposition, however, must occur before vulcanization proceeds to such an extent that cell formation is restricted. Complete evolution of gas should occur prior to completion of vulcanization to produce a blown product of as low density as possible. Still further, the blowing agent must not interfere with rubber vulcanization accelerators or other additives, or itself substantially accelerate or retard the vulcanization process.

Both inorganic and organic compounds have been employed as blowing agents. Among these might be mentioned various inorganic nitrites such as ammonium nitrite, sodium nitrite with an ammonium salt, and carbonates such as ammonium carbonates. Generally, however, these are unstable and produce undesirable changes in the material treated. Particularly detrimental to rubber are the large quantities of oxides of nitrogen evolved in the decomposition of these inorganic nitrites. Also, the carbon dioxide evolved, when a carbonate such as ammonium carbonate is used, is also objectionable because of its rapid diffusion rate out of the rubber.

It has now been found, in accordance with the present invention, that cellular products of excellent characteristics may be obtained by using amidine nitrites as blowing agents. These compounds may be represented by the following formula:

$$R-\underset{\underset{NH_2}{\|}}{C}-NH\cdot HNO_2$$

in which R is alkyl, alkenyl, aryl, aralkyl, amino, guanidino or ureido. As representative of the blowing agents of this invention, there may be mentioned acetamidine nitrite, propionamidine nitrite, butyramidine nitrite, caproylamidine nitrite, benzamidine nitrite, substituted benzamidine nitrites, tolamidine nitrite, benzylamidine nitrite, substituted benzylamidine nitrites, guanidine nitrite and its alkyl, aryl aralkyl and heterocyclic derivatives such as N-mono- and N,N-di-methyl, ethyl, propyl and guanidine nitrites, N-mono- and N,N-di-phenyl, tolyl and xylyl guanidine nitrites, N-mono- and N,N-dibenzylguanidine nitrites and morpholino, piperidino and furfurylamino guanidine nitrites, biguanide nitrite and its corresponding derivatives and guanylurea nitrite and its corresponding derivatives.

An advantage of the present invention is that the new class of blowing agents may be prepared by known methods. They may be prepared from an amidine salt, the cation of the acid being so chosen as to give an insoluble precipitate when the amidine salt is reacted with a metal nitrite. Alternatively, the hydrochloride of the amidine may be reacted with an alkali metal nitrite followed by evaporation and subsequent extraction of the amidine nitrite with alcohol or other suitable organic solvents, in which it is soluble.

The blowing agents of this invention may be employed for blowing rubber as well as plastic materials. By rubber is meant natural rubber as well as synthetic rubberlike polymers of butadiene-1,3 and substituted butadienes such as methyl-2-butadiene-1,3, chloro-2-butadiene-1,3 and the like. In addition, it is intended to include copolymers of butadiene-1,3 with a polymerizable compound containing an olefinic linkage such as acrylonitrile, styrene, acrylamide, isobutylene and the like. By plastics is meant polymerized vinyl and acrylic compounds, polymerized olefins, cellulose esters, cellulose ethers, polyester resins, epoxy resins, urea-aldehyde resins, phenolaldehyde resins and the like. By the term organoplastic used in accordance with this invention, it is meant to include all of these.

The amount of blowing agent employed in accordance with this invention will vary according to the type of product to be blown as well as the degree of blow desired. Thus in the manufacture of cellular rubber products, whether natural rubber or synthetic polymers and copolymers such as polymerized butadiene-1,3, copolymerized butadiene-styrene, butadiene-acrylonitrile and the like, as little as 0.5% by weight on the rubber may be employed. Products of decreasing densities are obtained using greater amounts of blowing agent. In general, the amount of blowing agent employed in the manufacture of cellular rubber will vary from about 0.5% to about 5% on the rubber, usually between about 1% and 3%. In the manufacture of cellular plastic materials, such, for instance, as urea-aldehyde resins, phenolaldehyde resins, vinyl polymers and the like, the amount of blowing agent will generally be greater than that necessary in rubber. In general, this amount will run from about 50% to about 30% by weight on the resin, depending again on the particular blowing agent, the resin to be blown, the degree of blow and the like.

The invention is further demonstrated by the following examples, which are intended to be illustrative only and not by way of limitation. Unless otherwise specified, all parts are by weight.

EXAMPLE 1

*Guanylurea nitrite*

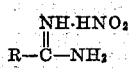 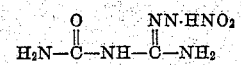

169 parts of guanylurea sulfate are dissolved in 1000 parts of water by heating to approximately 80° C. and made slightly alkaline with sodium hydroxide solution. 126 parts of barium nitrite monohydrate, of 98.3% purity, is dissolved in 400 parts of water at approximately 45° C. and added with stirring to the solution of guanylurea sulfate at about 80–90° C. After stirring at this temperature for 30 minutes, 40 parts of diatomaceous earth are added, the mixture stirred for 10–15 minutes, and then filtered hot. Crystals of guanylurea nitrite are obtained by evaporation and cooling. Yield is 83.5 parts. Melting point with decomposition is about 139° C.

EXAMPLE 2

*Biguanide nitrite*

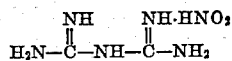

336 parts of biguanide sulfate are dissolved in 400 parts of water at 90° C. To this is added with stirring at 90° C. a solution of 252 parts of 98.3% pure barium nitrite monohydrate dissolved in 200 parts of water. 40 parts of diatomaceous earth are then added and the mixture filtered. The filtrate is cooled and evaporated to obtain 180 parts of biguanide nitrite. Melting point with decomposition about 185–186° C.

EXAMPLE 3

*Phenylbiguanide nitrite*

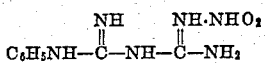

21.4 parts of phenylbiguanide hydrochloride are dissolved in 250 parts of water at 70° C. To this is added 7 parts of sodium nitrite solution and the solution evaporated to dryness. The residue is extracted with 200 parts by volume of boiling alcohol. On cooling the phenylbiguanide nitrite separates and is isolated by filtration and dried. Melting point is 188° C. with decomposition.

EXAMPLE 4

*Guanidine nitrite*

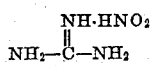

180.1 parts of guanidine carbonate are dissolved in 325 parts of water at about 50° C. and the resulting solution clarified by the addition of diatomaceous earth and decolorizing carbon and filtered. To the filtered solution is then added a solution 138.2 parts of sodium nitrite dissolved in 200 parts of water. The mixture is evaporated to dryness and then boiled up with 400 parts of denatured alcohol and the mixture filtered. On cooling the filtrate a small amount of guanidine nitrite crystallizes out. The remainder of the solution is evaporated to one-half its volume, cooled to 5° C. and a larger crop of crystals obtained. Yield of product is 60.2 parts, M.P. 99–110° C.

EXAMPLE 5

*Acetamidine nitrite*

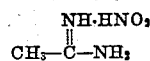

46.2 parts of silver nitrite is ground up fine in a mortar with 400 parts of water. This slurry is then mixed with a solution of 28.4 parts of acetamidine hydrochloride and 100 parts of water. The mixture is stirred for 1 hour at room temperature and the curdy white precipitate of silver chloride filtered off. The filtrate is evaporated to small volume and the yellowish crystals filtered off and dried at 50° C. These crystals, 24.7 parts, are recrystallized from approximately 10 parts of alcohol after boiling with diatomaceous earth and decolorizing carbon. The purified product is a white crystalline material which melts with decomposition between 155–160° C.

EXAMPLE 6

*Butyramidine nitrite*

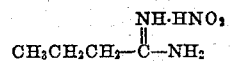

122.5 parts of butyramidine hydrochloride are dissolved in 300 parts of water and to it is added with rapid stirring, at room temperature, a slurry of 154 parts of finely-ground silver nitrite and 100 parts of water. The mixture is stirred at room temperature until the reaction is complete. The precipitated silver chloride is then filtered off and the filtrate evaporated to small volume and cooled. The product, butyramidine nitrite, crystallizes out and is further purified by recrystallization from alcohol.

EXAMPLE 7

*Benzamidine nitrite*

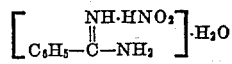

The procedure of Example 3 is repeated replacing phenylbiguanide hydrochloride with an equivalent amount of benzamidine hydrochloride. Benzamidine nitrite, M.P. 70° C., is recovered.

EXAMPLE 8

Rubber stocks are compounded according to the following composition:

| Compound: | Parts |
| --- | --- |
| Plasticized smoked sheet | 100 |
| 2,2'-methylene-bis(4-methyl-6-t-butylphenol) | 0.5 |
| Stearic Acid | 2 |
| Zinc oxide | 5 |
| Sulfur | 3 |
| Petrolatum | 3 |
| Keystone whiting | 50 |
| Light process aid | 10 |
| Benzothiazolyldisulfide | 0.6 |
| Di-o-tolyl guanidine | 0.15 |
| Blowing agent | 1.5 |

Guanylurea nitrite, biguanide nitrite, guanidine nitrite, and acetamidine nitrite are employed as blowing agents. Each stock is blown at 130° C. for 60 minutes. The mold load is 6 cubic inches and a 200% expansion load (51 grams) is blown in each instance. Complete blows are obtained except in the case of biguanide nitrite in which the corners are slightly rounded. Cell size is fine for those products blown with biguanide nitrite and acetamidine nitrite and medium-fine in the products blown with guanylurea nitrite and guanidine nitrite.

EXAMPLE 9

To illustrate the blowing of plastics, 5.0% guanylurea nitrite is incorporated in Bakelite polyethylene DYNH along with 0.1% antioxidant 2,2'-methylene-bis(4-ethyl-6-t-butylphenol). A 200% expansion load (51 grams) is blown in a 6 cubic inch mold at 170° C. for 20 minutes. A complete blow is obtained, the blown product having medium fine cells.

We claim:

1. A process of producing a cellular rubber which comprises forming an uncured, curable rubber stock containing an amidine nitrite of the formula

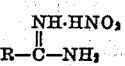

in which R is selected from the group consisting of alkyl, aryl, aralkyl, amino, guanido and ureido radicals as a blowing agent and heating said stock to a temperature sufficient to cure the rubber and form a cellular product, said blowing agent being employed in an amount sufficient to form a cellular product.

2. A process according to claim 1 in which the amidine nitrite is guanylurea nitrite.

3. A process according to claim 1 in which the amidine nitrite is guanidine nitrite.

4. A process according to claim 1 in which the amidine nitrite is acetamidine nitrite.

5. A process according to claim 1 in which the amidine nitrite is biguanide nitrite.

6. An uncured, curable rubber stock containing as a blowing agent blowing amounts within the range of about 0.5% to about 5% by weight on the rubber of an amidine nitrite of the formula

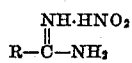

in which R is selected from the group consisting of alkyl, aryl, aralkyl, amino, guanido and ureido radicals.

7. A composition according to claim 6 in which the blowing agent is guanylurea nitrite.

8. A composition according to claim 6 in which the blowing agent is guanidine nitrite.

9. A composition according to claim 6 in which the blowing agent is acetamidine nitrite.

10. A composition according to claim 6 in which the blowing agent is biguanide nitrite.

References Cited in the file of this patent

UNITED STATES PATENTS

| | | |
|---|---|---|
| 2,261,459 | Cooper et al. | Nov. 4, 1941 |
| 2,261,677 | Foster et al. | Nov. 4, 1941 |
| 2,635,116 | Wolfe et al. | Apr. 14, 1953 |
| 2,649,353 | Streck | Aug. 18, 1953 |

OTHER REFERENCES

Chem. Abs., volume 9, page 610, 1915.